Feb. 17, 1953  C. F. VOYTECH  2,628,852

COOLING SYSTEM FOR DOUBLE SEALS

Filed Feb. 2, 1949

INVENTOR
Charles F. Voytech
BY

Patented Feb. 17, 1953

2,628,852

UNITED STATES PATENT OFFICE 2,628,852

COOLING SYSTEM FOR DOUBLE SEALS

Charles F. Voytech, Chicago, Ill., assignor to Crane Packing Company, Chicago, Ill., a corporation of Illinois Application February 2, 1949, Serial No. 74,216

5 Claims. (Cl. 286—11.14)

This invention relates to mechanical rotary seals and particularly to a cooling means for this type of seal.

Mechanical rotary seals are frequently required to handle hot fluids, the temperature of which is so high as to affect adversely the condition of the sealing faces and the flexible sealing medium used to seal the surface with respect to its support. The heat of friction developed by the relative rotation btween the sealing surfaces frequently is of itself sufficiently high to affect adversely the condition of the surfaces. This frictionally developed heat is particularly bad where the fluid sealed, though itself at a favorable working temperature, is not a particularly good lubricant so that the seal faces are in effect operating in a dry condition. The dry operation is aggravated when high speeds and pressures are encountered, both of which add to the frictional forces developed which in turn are translated into heat.

Various means for cooling the seal surfaces have been proposed. One such means utilizes the rotating element of the seal as a vaned pump to circulate the fluid adjacent the seals around the cooperating sealing element. The vaned type of cooling system, however, causes a circulation of the fluid having a tangential component of movement which may produce an undesirable torque upon the cooperating sealing element.

The principal object of this invention is to provide a cooling system for a rotary mechanical seal wherein the fluid is directed across the ends of the cooperating seal faces in a predetermined direction.

A more specific object of this invention is to provide a cooling system for a rotary mechanical seal wherein the rotary element of the seal is provided with vanes which induce an axial flow in a surrounding coolant and in which stationary flow straightening means is provided to remove any tangential component in the flow of the coolant as it passes over the cooperating sealing element.

A still further object of this invention is to provide a cooling system for a rotary mechanical seal having a stationary sealing washer and a rotating sealing washer, both of which are formed with axially extending vanes such that the rotary vanes act as a pump and the stationary vanes act as cooling fins, with a flow straightener introduced between the two sets of vanes to eliminate any torque in the vanes on the stationary sealing washer.

Figure 1:
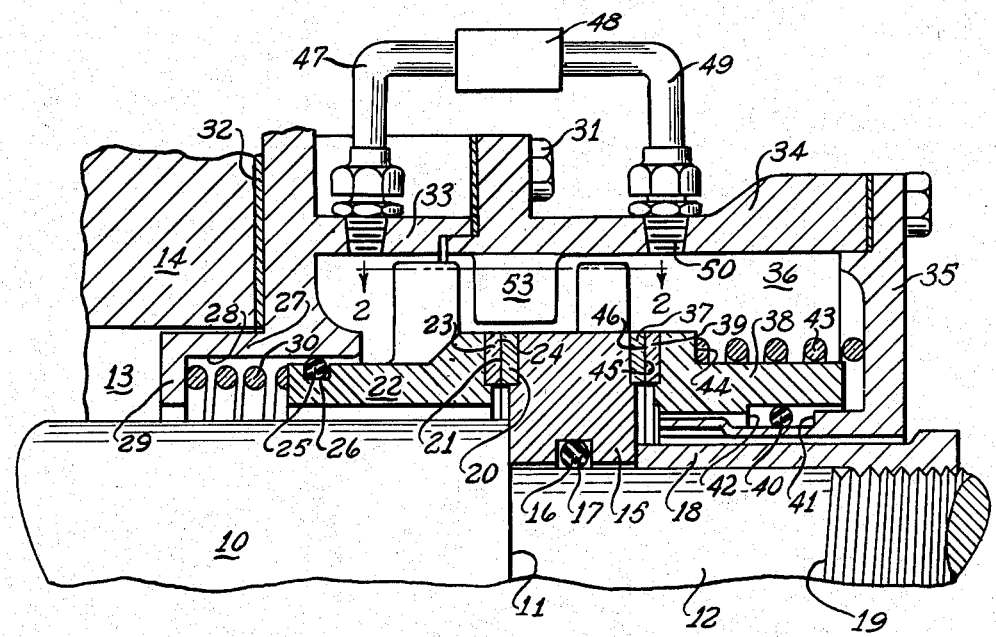
Figure 2:
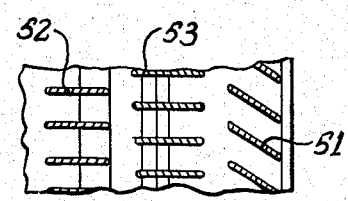

These and other features of this invention will become apparent from the following detailed description when taken together with the accompanying drawings, in which:

Fig. 1 is a fragmentary quarter-section taken through a rotary mechanical seal incorporating the features of this invention; and Fig. 2 is a fragmentary section through the vanes taken along line 2—2 of Fig. 1, showing the relative angularity of the vanes on the rotary seal as well as the flow straightener.

Referring now to Fig. 1 for a detailed description of the invention, there is shown a shaft 10 having a shoulder 11 formed by a reduced diameter section 12. Said shaft 10 passes through an opening 13 in a housing 14, opening 13 being in communication with a fluid to be sealed. This fluid may be a volatile gas such as propane or butane and may have poor lubricating qualities. If the housing 14 is that of a pump, such as might be used on a pipe line for transporting propane from a refinery to a distant city, it is known that the propane is rendered substantially worthless if even a relatively minute quantity of oil is permitted to contaminate the propane. Thus it is not desirable in any seal that might be used between the shaft and housing to use oil under pressure as a lubricating medium.

The seal for preventing the escape of the fluid from opening 13 is comprised of a collar 15 which encircles reduced section 12 of shaft 10 and is sealed therefrom by means of a ring 16 of packing, said ring in the form selected for illustration being comprised of rubber and having a circular radial cross-section. Ring 16 is confined in a groove 17 formed in the interior of washer 15, the dimensions of the groove being such that ring 16 is compressed against section 12 by the groove. Collar 15 is clamped against shoulder 11 by a sleeve 18 which is threaded at 19 upon section 12. Thus, sleeve 18 and collar 15 are constrained to rotate with shaft 10, and are held against axial movement thereon by the threaded section 19.

Collar 15 is provided with a wear-resistant insert 20 having a surface 21 which is radially disposed with respect to the axis of rotation of shaft 10 and which is suitably ground and lapped so as to be perfectly flat and smooth. Cooperating with insert 20 is a sealing washer 22 which is likewise provided with an insert 23 of a hard wear-resistant material having a radially disposed surface 24 which is ground and lapped so as to be perfectly flat and smooth. Thus surfaces 21 and 24 when pressed together form a gas-tight seal despite any relative rotation that might take place between washer 22 and collar 15.

Washer 22 is sealed with respect to housing 14 by means of a ring 25 of resilient compressible packing such as rubber or the like which is contained in a groove 26 formed in washer 22. A closure-plate 27 serves as the mounting means for washer 22 and is formed with a cylindrical surface 28 against which ring 25 is compressed by the bottom of groove 26. An abutment 29 is formed on closure-plate 27, and a spring 30 is compressed between the left-hand end of washer 22, as viewed in Fig. 1, and the abutment 29 to provide an axial force for holding washer 22 and its surface 24 against surface 21 on collar 15. Closure-plate 27 is bolted as at 31 to housing 14, with the usual gasket 32 inserted between the said closure-plate and housing to form a fluid-tight seal.

A chamber 36 for holding a coolant is provided around collar 15 and washer 22. This chamber is formed in part by an axial extension 33 on closure-plate 27, by a cylindrical coolant housing 34 and by a coolant housing closure-plate 35. In order to prevent the escape of the coolant out of chamber 36, a rotary mechanical seal is provided, the seal being comprised of a second insert 37 on collar 15 on the side opposite to that on which insert 20 is applied, and by a sealing washer 38 having an insert 39 thereon cooperating with insert 37 to provide a fluid-tight seal. Washer 38 is sealed with respect to closure-plate 35 by a ring 40 of resilient deformable packing made of rubber or the like and having a circular radial cross-section. Instead of a groove, ring 40 operates in a space defined by a shoulder 41 on closure-plate 35 and another shoulder 42 formed in washer 38. A spring 43 is compressed between closure-plate 35 and an abutment 44 on washer 38 so as to exert an axial force on the washer to hold said washer in contact with insert 37. It is understood that radial surface 45 on insert 37 and radial surface 46 on insert 39 are ground and lapped so as to provide a fluid-tight running fit between inserts 37 and 38.

The coolant in chamber 36 is adapted to be circulated through an outlet conduit 47 disposed adjacent washer 22, a heat extracting device 48 of any suitable character and an inlet conduit 49 having an opening 50 in proximity to collar 15. The circulation of the coolant is induced by a series of radially disposed vanes 51 which, as shown in Fig. 2, are turned at an angle with respect to the axis of rotation of shaft 10, such that if the rotation is in the direction of the arrow, the coolant will be urged axially as well as rotationally by the rotation of the collar 15 and its vanes 51. In order to extract the heat from washer 22 as rapidly as possible, a plurality of cooling fins 52 are formed on the outer surface of the washer, said fins 52 being disposed parallel to the axis of rotation of the shaft 10 and extending radially outwardly from the washer.

It is obvious from the foregoing description that the rotational component induced in the coolant by vanes 51 will tend to rotate washer 22 in the same direction and thus would tend to turn the washer with respect to the packing ring 25. This rotating action is undesirable since, if the ring were set in motion by the fluid, packing ring 25 would soon wear to the point where it no longer was effective to provide a seal between closure-plate 27 and washer 22. Furthermore, the torque imposed on washer 22 by the fluid might tend to change its position relative to collar 15 to the point where surfaces 21 and 24 are no longer in intimate contact with one another, thereby again tending to destroy the seal between shaft 10 and housing 14.

To eliminate the circumferential component of movement in the coolant, a plurality of flow straightening vanes 53 are provided on housing 34. Vanes 53 are parallel with fins 52 and extend radially inwardly almost in contact with washer 15, such that substantially all of the coolant must pass through the flow straightening vanes 53 before it can contact cooling fins 52 on washer 22.

In operation, the rotation of shaft 10 compels the rotation of collar 15 and its associated vanes 51 which in turn induces an axial flow in the coolant in chamber 36. This axial flow is straightened by flow straightening vanes 53 so that the fluid impinges upon fins 52 of washer 22 in the desired manner. The pressure of the coolant as it leaves fins 52 is sufficiently high to force the coolant out of chamber 36 through outlet conduit 47 into the heat extractor 48 and then through inlet conduit 49 back to chamber 36. This circulation, since it is a result of the rotation of shaft 10, is therefore a function of the rotation of shaft 10 so that the faster the shaft rotates, the greater will be the movement of the coolant. This relationship is desirable since the heat generated between surfaces 21 and 24 is likewise a function of the speed of rotation of shaft 10 relative to washer 22. Inasmuch as the fluid passes directly over the outer edges of the inserts 20 and 23, the maximum cooling effect will be secured at the surface while the passage of the coolant through the cooling fins 52 will effect a maximum heat extraction from the body of the washer 22.

Vanes 51 and 53 and fins 52 may be formed as integral parts of the elements with which they are directly associated. Thus they may be cast or machined into collar 15, washer 22 and housing 34. It is contemplated, however, that any other suitable means for forming the said vanes may likewise be utilized. It is also contemplated that the relative angularity between the vanes 51 and 53 and fins 52 may be varied to secure any desired effect upon fins 52 and the associated washer 22. Thus the direction of the fluid may be reversed with respect to the direction of rotation of vanes 51. When so reversed, the friction torque developed between surfaces 21 and 24 can be balanced by the fluid pressure and no mechanical holding means will be required to prevent relative rotation between washer 22 and plate 27.

It is understood that the foregoing description is illustrative of a preferred embodiment of this invention and that the scope of the invention is not to be limited thereto, but is to be determined by the appended claims.

What is claimed is:

1. In combination with a rotary sealing device having a member provided with a radially disposed sealing surface and a rotatable member having a radially disposed sealing surface in contact with the first-mentioned sealing surface to form a fluid-tight seal therebetween, cooling means for the members, said cooling means comprising a housing surrounding the sealing device and defining a chamber around the said device, a resilient support for the first-mentioned member on said housing to allow the said first-mentioned member to move relative to the housing to take up for wear and misalignment of said members, a coolant in the chamber and in contact with the sealing device, and means for circulating the coolant over the said members, said means comprising vanes rotatable with the rotatable member and adapted to force the coolant toward the other member, cooling fins on the said other member in the path of the coolant, and means between the vanes and fins and operable upon the coolant for substantially eliminating torque on the said other member resulting from passage of the coolant over the said other member.

2. In combination with a rotary sealing device having a member provided with a radially disposed sealing surface and a rotatable member having a radially disposed sealing surface in contact with the first-mentioned sealing surface to form a fluid-tight seal therebetween, cooling means for the members, said cooling means comprising a housing surrounding the sealing device and defining a chamber around the device, said rotatable member passing through the housing, means for effecting a seal between the housing and rotatable member, a coolant in the chamber, means on the rotatable member for inducing a flow of the coolant over the first-mentioned member, cooling fins on the said first-mentioned member in the path of the coolant and means on the housing interposed in the coolant flow ahead of the fins for substantially eliminating any tangential component of the flow relative to the fins.

3. The combination described in claim 2, said last-mentioned means comprising a plurality of vanes on the housing, said vanes being substantially parallel with the fins on the first-mentioned member.

4. The combination described in claim 2, said means for inducing flow in the coolant comprising vanes on the rotatable member extending radially into proximity to the housing and axially spaced from the cooling fins, and said last-mentioned means comprising vanes on the housing extending radially into proximity to the housing and disposed in the space between the fins and flow-inducing vanes.

5. The combination described in claim 2, said means for inducing flow in the coolant comprising vanes on the rotatable member extending radially into proximity to the housing and axially spaced from the cooling fins, said last-mentioned means comprising vanes on the housing extending radially into proximity to the housing and disposed in the space between the fins and flow-inducing vanes, an external heat-extracting means for the coolant, and conduits connecting the chamber with the external heat-extracting means.

CHARLES F. VOYTECH.

REFERENCES CITED

The following references are of record in the file of this patent:

UNITED STATES PATENTS

| Number | Name | Date |
| --- | --- | --- |
| 1,421,221 | Harter | June 27, 1922 |
| 2,494,887 | Lenhart | Jan. 17, 1950 |